(12) United States Patent
Xiong et al.

(10) Patent No.: US 12,038,277 B2
(45) Date of Patent: Jul. 16, 2024

(54) HIGH-PRECISION WATERWAY RECONSTRUCTION METHOD BASED ON MULTI-SATELLITE SOURCE INFORMATION COUPLING

(71) Applicant: BUREAU OF HYDROLOGY, CHANGJIANG WATER RESOURCES COMMISSION, Wuhan (CN)

(72) Inventors: Ming Xiong, Wuhan (CN); Quanxi Xu, Wuhan (CN)

(73) Assignee: BUREAU OF HYDROLOGY, CHANGJIANG WATER RESOURCES COMMISSION, Wuhan (CN)

( * ) Notice: Subject to any disclaimer, the term of this patent is extended or adjusted under 35 U.S.C. 154(b) by 0 days.

(21) Appl. No.: 17/584,421

(22) PCT Filed: Jul. 30, 2021

(86) PCT No.: PCT/CN2021/109425
§ 371 (c)(1),
(2) Date: Jan. 26, 2022

(87) PCT Pub. No.: WO2022/188338
PCT Pub. Date: Sep. 15, 2022

(65) Prior Publication Data
US 2023/0221116 A1 Jul. 13, 2023

(30) Foreign Application Priority Data
Mar. 9, 2021 (CN) .......................... 202110253051.5

(51) Int. Cl.
*G01C 13/00* (2006.01)
*G06T 7/521* (2017.01)
(Continued)

(52) U.S. Cl.
CPC .............. *G01C 13/00* (2013.01); *G06T 7/521* (2017.01); *G06T 7/55* (2017.01); *G06T 17/05* (2013.01);
(Continued)

(58) Field of Classification Search
CPC ... G06T 7/50–596; G06T 2207/10032–10044; G06T 2207/30181; G06T 17/05; G01C 13/00–008
See application file for complete search history.

(56) References Cited

U.S. PATENT DOCUMENTS

2020/0149888 A1* 5/2020 Long .......................... G06T 7/55

FOREIGN PATENT DOCUMENTS

| CN | 103363962 A | 10/2013 |
| CN | 104197902 A | 12/2014 |

(Continued)

OTHER PUBLICATIONS

Tourian, Mohammad J., et al. "Estimating river depth from SWOT-type observables obtained by satellite altimetry and imagery." Water 9.10 (2017): 753. (Year: 2017).*

(Continued)

*Primary Examiner* — Geoffrey E Summers
(74) *Attorney, Agent, or Firm* — Bayramoglu Law Offices LLC

(57) ABSTRACT

A high-precision waterway reconstruction method based on a multi-satellite source information coupling is provided. The method includes a determination method for a waterway section, a reconstruction method for a basic waterway section high-precision coupling, a reconstruction method for a fixed waterway section coupling, and a reconstruction method for a river reach waterway terrain. The method fills the gap of surveying and mapping of the waterways based on satellite remote sensing information, extremely improves the (Continued)

perpendicular precision and planar precision of the existing digital surface model of satellites for river waterways, and provides decision support for a water-related emergency rescue in areas lacking data.

8 Claims, 3 Drawing Sheets

(51) Int. Cl.
  *G06T 7/55* (2017.01)
  *G06T 17/05* (2011.01)
(52) U.S. Cl.
  CPC ............. *G06T 2207/10032* (2013.01); *G06T 2207/30181* (2013.01)

(56) References Cited

FOREIGN PATENT DOCUMENTS

| | | |
|---|---|---|
| CN | 105352476 A | 2/2016 |
| CN | 105910579 A | 8/2016 |
| CN | 108645456 A | 10/2018 |
| CN | 108896117 A | 11/2018 |
| CN | 109269469 A | 1/2019 |
| CN | 109960838 A | 7/2019 |
| CN | 110490800 A | 11/2019 |
| CN | 111681316 A | 9/2020 |
| CN | 111735430 A | 10/2020 |
| CN | 111735437 A | 10/2020 |
| CN | 111895979 A | 11/2020 |
| CN | 111951392 A | 11/2020 |
| CN | 112214821 A | 1/2021 |
| CN | 112233234 A | 1/2021 |
| CN | 112415219 A | 2/2021 |
| CN | 112629493 A | 4/2021 |
| JP | H0989558 A | 4/1997 |
| KR | 101271402 B1 | 6/2013 |
| KR | 101571886 B1 | 11/2015 |
| WO | 2013121340 A1 | 8/2013 |

OTHER PUBLICATIONS

Long Yuannan, et al., A new method for extracting lake bathymetry using multi-temporal and multi-source remote sensing imagery: A case study of Dongting Lake, Acta Geographica Sinica, 2019, pp. 1467-1481, vol. 74, No. 7.

Zhi Zai-Xing, et al., Quartic Hermite spline with parameter for river channel reconstruction and application research, Chinese Journal of Hydrodynamics, 2018, pp. 500-507, vol. 33, No. 4.

Kuo-Hsin Tseng, et al., Reconstruction of time-varying tidal flat topography using optical remote sensing imageries, ISPRS Journal of Photogrammetry and Remote Sensing, 2017, pp. 92-103, vol. 131.

SL257-2000, Code for waterway survey, 2000, pp. 7-87, China's Ministry of Water Resources.

\* cited by examiner

HIGH-PRECISION WATERWAY RECONSTRUCTION METHOD BASED ON MULTI-SATELLITE SOURCE INFORMATION COUPLING

CROSS REFERENCE TO THE RELATED APPLICATIONS

This application is the national phase entry of International Application No. PCT/CN2021/109425, filed on Jul. 30, 2021, which is based upon and claims priority to Chinese Patent Application No. 2021102530515, filed on Mar. 9, 2021, the entire contents of which are incorporated herein by reference.

TECHNICAL FIELD

The present invention relates to the technical field of waterway surveying and mapping application, and more particularly relates to a high-precision waterway reconstruction method based on a multi-satellite source information coupling.

BACKGROUND

The resolution of satellite remote sensing varies greatly in a planar resolution or a perpendicular resolution based on different using purposes. Currently, the planar resolution of a high-precision panchromatic orthophoto image satellite can reach less than 50 cm, and evert the perpendicular resolution of the satellite provided with a radar altimeter or a laser altimeter can reach less than 10 cm. However, the plane information and elevation information generally cannot be obtained at the same time by one of the two types of satellites, or the resolution is relatively low. The planar resolution and perpendicular resolution of the most advanced satellite three-dimensional images (GSM) only can reach tens of meters. Therefore, the requirements of high-precision surveying and mapping cannot be satisfied when the above satellites are used individually.

When the technology gets a process, the planar resolution or the perpendicular resolution of the satellite may be further improved. However, no matter what type of satellite is used, only planar information observation or elevation information observation above the water surface can be carried out, and the terrain data below the water surface cannot be obtained. By sufficiently using the satellite sources of the high-precision observation satellite for a planar observation and a perpendicular observation, and the relationship between the plane and elevation difference of satellite three-dimensional images (GSM) and according to the characteristics of water level fluctuation with season and satellite revisit regularity, the historical observation information of the above three types of satellites are coupled, so as to reconstruct high-precision waterway terrain, which is an effective means.

SUMMARY

In order to solve the above shortcomings of the prior art, an objective of the present invention is to provide a high-precision waterway reconstruction method based on the multi-satellite source information coupling, so as to improve the existing digital surface model of satellites to the maximum extent.

In order to achieve the above objectives, the technical solutions adopted by the present invention are as follows.

A high-precision waterway reconstruction method based on the multi-satellite source information coupling includes:

S1: determining a waterway section: according to characteristics of a river to be observed in a waterway, selecting various types of satellites to revisit rivers having a close position with each other, and determining a riverway cross section where a waterway echo point of a high-precision altimetry satellite is located as a basic waterway section, selecting a cross section as a fixed waterway section at a certain distance at the upstream and downstream of the basic waterway section by using the latest high-precision orthophoto remote sensing image information;

S2: reconstructing a basic waterway section high-precision coupling: by using historical information of an altimetry satellite for the basic waterway section and an orthophoto remote sensing image satellite near the basic waterway section, and through a joint coupling between satellite source revisit time and observation elements, constructing a high-precision coordinate set of a water level, a water surface width and water-bank intersection points of the basic waterway section, where in S2, implementation steps of the joint coupling between the satellite source revisit time and the observation elements include:

S21: establishing a time-dependent joint distribution function between a section water level $H_{basic}(t)$ of the basic waterway observed by the altimetry satellite and a section width $B_{basic}(t)$ observed by an orthophoto remote sensing image, or plotting process graphs of $H_{basic}(t) \sim t$ and $B_{basic}(t) \sim t$;

S22: solving a section water surface width at time points of a water level observed by the altimetry satellite, and a water level at time points of a section width observed by the orthophoto remote sensing image, or interpolating the section water surface width at the time points of the water level observed by the altimetry satellite in a process graph of $B_{basic}(t) \sim t$, and interpolating the water level at the time points of the section width observed by the orthophoto remote sensing image in a process graph of $H_{basic}(t) \sim t$;

S23: according to all values of the water level or the water surface width solved or interpolated, establishing a function $H_{basic} \sim f(B_{basic})$ between the section water level and the section width of the basic waterway, or plotting a correlation diagram of $H_{basic} \sim f(B_{basic})$;

S24: interpolating values of $H_{basic} \sim f(B_{basic})$, or discretizing the correlation diagram of $H_{basic} \sim B_{basic}$ to form $(H_{basic\ i}, B_{basic\ i})$;

where $(H_{basic\ i}, B_{basic\ i})$ is a set of the section water level and the section width of the basic waterway and S25: selecting at least one time point when a recently water level is slightly lower than $H_{basic\ i}$ and at least one time point when a recently water level is slightly higher than $H_{basic\ i}$ to closely observe orthophoto remote sensing images, checking water-bank intersection point coordinates corresponding to left and right banks of the river, and constructing three-dimensional coordinate sets $(x_{basic\ left\ i}, y_{basic\ left\ i}, H_{basic\ i})$ and $(x_{basic\ right\ i}, y_{basic\ right\ i}, H_{basic\ i})$;

where $H_{basic\ i}$ is a discretized section water level of the basic waterway;

$(x_{basic\ left\ i}, y_{basic\ left\ i}, H_{basic\ i})$ and $(x_{basic\ right\ i}, y_{basic\ right\ i}, H_{basic\ i})$ are coordinate sets constituted by the water-bank intersection point coordinates of the left and right banks, and the section water level of the basic waterway;

S3: reconstructing a fixed waterway section coupling: by using historical information of the altimetry satellite for the basic waterway section, a cartographic satellite near the basic waterway section, and the orthophoto remote sensing image satellite near the basic waterway section, rough a coupling of revisit time and hydraulic interaction between the altimetry satellite and the cartographic satellite, constructing a set of a water level of the fixed waterway section corresponding to the basic waterway section, through a joint coupling of revisit time and observation elements between the altimetry satellite and the orthophoto remote sensing image satellite, constructing a coordinate set of the water level, a water surface width and water-bank intersection points of the fixed waterway section;

where in S3, implementation steps of the coupling of the revisit time and the hydraulic interaction between the altimetry satellite and the cartographic satellite include:

S301: establishing a time-dependent joint distribution function between the section water level $H_{basic}(t)$ of the basic waterway observed by the altimetry satellite and a water level $H_{cartographic\ basic}(t)$ observed by the cartographic satellite, or plotting process graphs of $H_{basic}(t)\sim t$ and $H_{cartographic\ basic}(t)\sim t$;

S302: solving a time point set $t_j$ and $H_{cartographic\ basic\ i}(t_j)$ of the joint distribution function corresponding to $H_{basic\ i}$, or solving or interpolating all occurring time point sets $t_j$ corresponding to $H_{basic\ i}$ in $H_{basic}(t)\sim t$ and solving or interpolating $H_{cartographic\ basic\ i}(t_j)$ corresponding to the all $t_j$ in $H_{cartographic\ basic}(t)\sim t$;

where $H_{basic\ i}$ is the discretized section water level of the basic waterway;

$H_{cartographic\ basic\ i}(t_j)$ is the water level observed by the cartographic satellite at a time point $t_j$;

where $t_j$ is the time point;

S303: calculating mathematical expected values $H_{cartographic\ basic\ i}=E(H_{cartographic\ basic\ i}(t_j))$ of all $H_{cartographic\ basic\ i}(t_j)$, and $\Delta H_{basic\ i}=H_{basic\ i}-H_{cartographic\ basic\ i}$, where $\Delta H_{basic\ i}$ is taken as a systematic error between the water level observed by the altimetry satellite and the water level observed by the cartographic satellite;

S304: establishing a distribution function of a water level $H_{cartographic\ k}(t)$ of the k-th fixed waterway section observed by a digital surface model of the cartographic satellite, and solving or interpolating $H_{cartographic\ k\ i}(t_j)$ corresponding to the time point set $t_j$, or plotting a process graph of $H_{cartographic\ k}(t)\sim t$ of the k-th fixed waterway section of the digital surface model of the cartographic satellite and interpolating $H_{cartographic\ k\ i}(t_j)$ corresponding to the time point set $t_j$ in the process graph;

where $H_{cartographic\ k\ i}(t_j)$ is a water level of the k-th fixed waterway section at the time point $t_j$; and S305: calculating mathematical expected values $H_{cartographic\ k\ i}=E(H_{cartographic\ k\ i}(t_j))$ of all $H_{cartographic\ k\ i}(t_j)$, to add the systematic error $\Delta H_{basic\ i}$ between the water level observed by the altimetry satellite and the water level observed by the cartographic satellite, that is, $H_{k\ i}=H_{cartographic\ k\ i}+\Delta H_{basic\ i}$ is the water level of the k-th fixed waterway section corresponding to $H_{basic\ i}$; and S4: reconstructing a river reach waterway terrain: according to the coordinate set of the water level and water-bank intersection points of the basic waterway section and the fixed waterway section, reconstructing waterway terrain survey scatter points, and drawing contours for mapping according to a mapping scale and a scatter point set.

Further, the waterway includes various types of water bodies of a natural river, a large canal, a lake, and a reservoir.

Further, multi-satellite sources include but are not limited to an altimetry satellite equipped with laser or radar altimeters, an orthophoto remote sensing image satellite, a resource with an integrated three-dimensional imaging, or a cartographic satellite.

Further, the waterway section is a section arranged on the river and perpendicular to a flow direction of the river.

Further, in S1, a revisit position of the satellite refers to a position that the satellite passes repeatedly during an orbital operation.

Further, in S1, the waterway echo point of the altimetry satellite refers to a position from which a radar or a laser emitted by the altimetry satellite and perpendicular to the earth is reflected by a water surface of the river.

Further, in S3, implementation steps of the joint coupling of the revisit time and the observation elements between the altimetry satellite and the orthophoto remote sensing image satellite include:

S311: establishing a time-dependent joint distribution function between the section water level $H_{basic}(t)$ of the basic waterway observed by the altimetry satellite and a section width $B_k(t)$ of the k-th fixed waterway section observed by the orthophoto remote sensing image, or plotting process graphs of $H_{basic}(t)\sim t$ and $B_k(t)\sim t$;

S312: solving a time point set $t_j$ and $B_{k\ i}(t_j)$ of the joint distribution function corresponding to $H_{basic\ i}$, or solving or interpolating all the occurring time point sets $t_j$ corresponding to $H_{basic\ i}$ in $H_{basic}(t)\sim t$ and solving or interpolating $B_{k\ i}(t_j)$ corresponding to all $t_j$ in $B_k(t)\sim t$;

where $B_{k\ i}(t_j)$ is a water surface width of the k-th fixed waterway section at the time point $t_j$;

S313: calculating mathematical expected values $B_{k\ i}=E(B_{k\ i}(t_j))$ of all $B_{k\ i}(t_j)$, and establishing a set $(H_{k\ i}, B_{k\ i})$ of the water level and the section width of the k-th fixed waterway section corresponding to $H_{basic\ i}$; and S314: selecting at least one time point when a recently water level is slightly lower than $H_{basic\ i}$ and at least one time point when a recently water level is slightly higher than $H_{basic\ i}$ to closely observe orthophoto remote sensing images, checking water-bank intersection point coordinates corresponding to left and right banks of the k-th fixed waterway section, and constructing three-dimensional coordinate sets $(x_{k\ left\ i}, y_{k\ left\ i}, H_{k\ i})$ and $(x_{k\ right\ i}, y_{k\ right\ i}, H_{k\ i})$;

where $(x_{k\ left\ i}, y_{k\ left\ i}, H_{k\ i})$ and $(x_{k\ right\ i}, y_{k\ right\ i}, H_{k\ i})$ are three-dimensional coordinate sets constituted by the water-bank intersection point coordinates corresponding to the left and right banks of the k-th fixed waterway section, and a corresponding fixed section.

Further, in S4, implementation steps of reconstructing the waterway terrain survey scatter points are as follows:

S41: obtaining three-dimensional coordinates $(x_{basic\ left\ i}, y_{basic\ left\ i}, H_{basic\ i})$ and $(x_{basic\ right\ i}, y_{basic\ right\ i}, H_{basic\ i})$ of the water-bank intersection points of the left and right banks of the basic waterway section corresponding to all $H_{basic\ i}$, (i=1, 2, ... n);

S42: obtaining the three-dimensional coordinates $(x_{k\ left\ i}, y_{k\ left\ i}, H_{k\ i})$ and $(x_{k\ right\ i}, y_{k\ right\ i}, H_{k\ i})$ of the water-bank intersection points of the left and right banks of all fixed waterway sections (k=1, 2, . . . m) corresponding to all (i=1, 2, . . . n); and S43: regarding all the three-dimensional coordinate points ($x_{basic\ left\ i}$, $y_{basic\ left\ i}$, $H_{basic\ i}$), ($x_{basic\ right\ i}$, $y_{basic\ right\ i}$, $H_{basic\ i}$), ($x_{k\ left\ i}$, $y_{k\ left\ i}$, $H_{k\ i}$) and ($x_{k\ right\ i}$, $y_{k\ right\ i}$, $H_{k\ i}$) as actually measured points to form the waterway terrain survey scatter points.

The advantages of the present invention are that by providing a high-precision waterway reconstruction method based on a multi-satellite source information coupling, the perpendicular precision and planar precision of the existing digital surface model of satellites for river waterways can be maximized, so as to provide a decision support for a water-related emergency rescue in areas lacking data. Moreover, this method fills the gap of surveying and mapping of the waterways based on satellite remote sensing information, and has excellent economic and social benefits to be suitable for popularization.

DETAILED DESCRIPTION OF THE EMBODIMENTS

In order to make the objectives, technical solution, and advantages of the present invention clearer, the present invention is further described in detail below in combination with the drawings. It should be understood that the specific embodiments described herein are used only to explain the present invention and are not used to limit the present invention.

Figure 1:
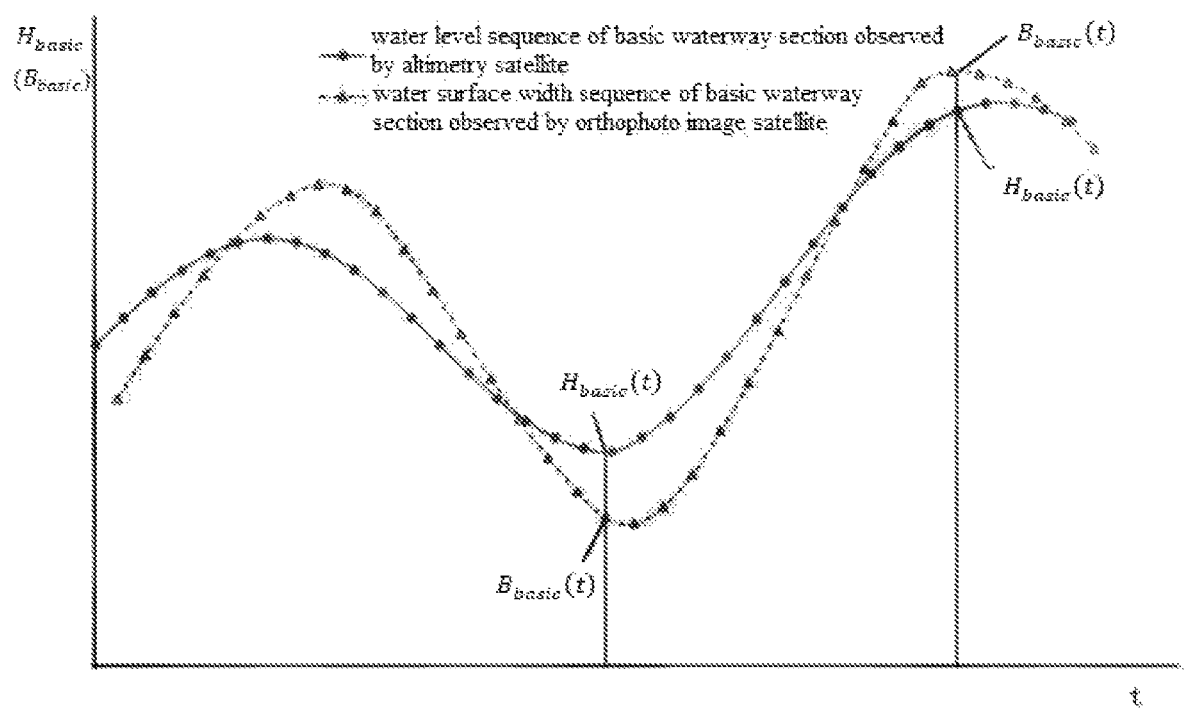
FIG. 1 is a schematic diagram showing a joint coupling between revisit time and observation elements of an altimetry satellite and art orthophoto remote sensing image satellite in the present invention.
Figure 2:
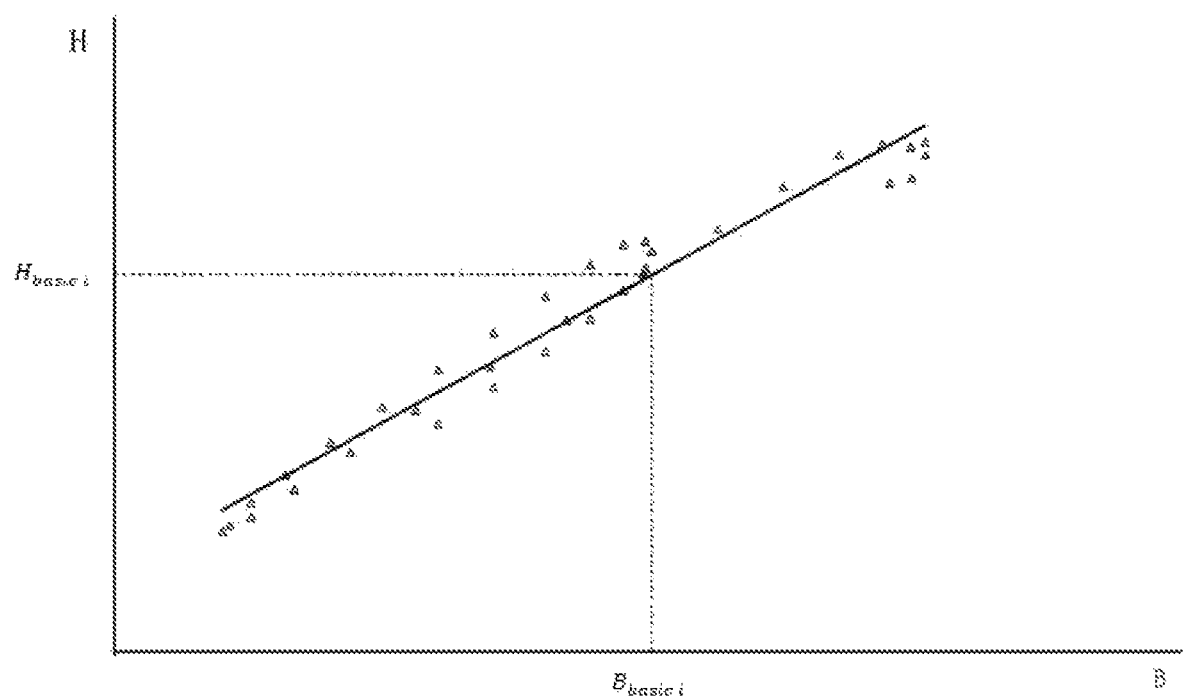
FIG. 2 is a schematic diagram showing a coupling between revisit time and hydraulic interaction of an altimetry satellite and a cartographic satellite in the present invention.

Referring to FIG. 1 and FIG. 2, a high-precision waterway reconstruction method based on a multi-satellite source information coupling. The technical solutions adopted include a determination method for a waterway section, a reconstruction method for a basic waterway section high-precision coupling, a reconstruction method for a fixed waterway section coupling, and a reconstruction method for a river reach waterway terrain.

In FIG. 1, $H_{basic}$ is the section water level of a basic waterway observed by an altimetry satellite.

$B_{basic}$ is a section width observed by an orthophoto remote sensing image; t is time.

In FIG. 2, H is a water level, and $H_{basic\ i}$ is a discretized section water level of the basic waterway.

H is a set of the section width, and B is a river width. $B_{basic\ i}$ is the section width of the basic waterway.

Figure 3:
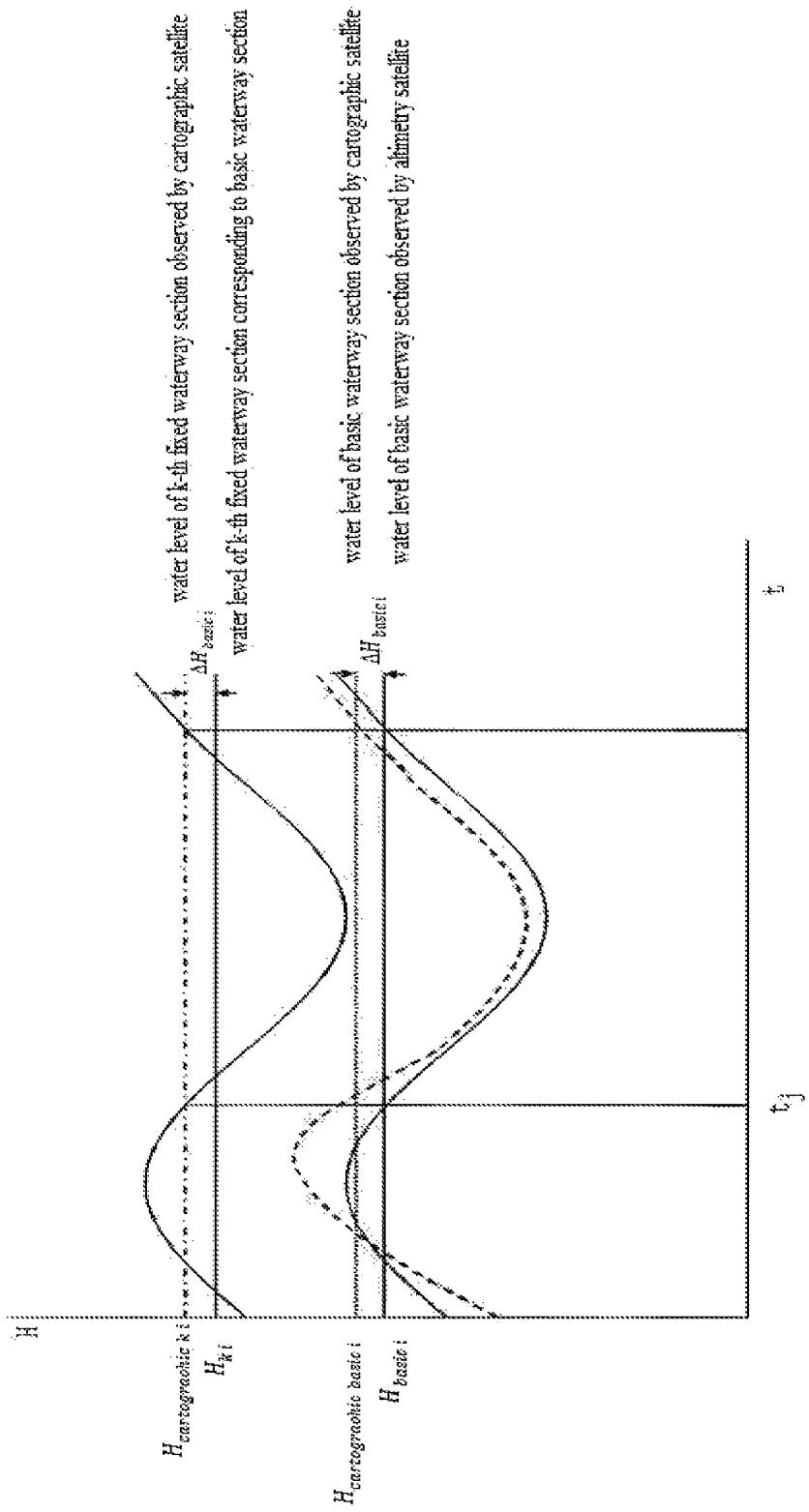
FIG. 3 shows a time point set 1 and a determination method for a waterway section.

In FIG. 3, $t_j$ is a time point set 1. The determination method for the waterway section is as follows:

according to the characteristics of the river to be observed in the waterway, various types of satellites are selected to revisit the rivers having a close position with each other, and a riverway cross section where the waterway echo point of a high-precision altimetry satellite is located is determined as the basic waterway section. A cross section is selected as a fixed waterway section at a certain distance at the upstream and downstream of the basic waterway section by using the latest high-precision orthophoto remote sensing image information.

2. The Reconstruction Method for the Basic Waterway Section High-Precision Coupling By using the historical information of the altimetry satellite for the basic waterway section and the orthophoto remote sensing image satellite near the basic waterway section, and through the joint coupling between the satellite source revisit time and observation elements, a high-precision coordinate set of the water level, a water surface width and the water-bank intersection points of the basic waterway section is constructed.

The implementation steps of the joint coupling between the satellite source revisit time and the observation elements of the basic waterway section are as follows:

S21. The time-dependent joint distribution function between the section water level $H_{basic}(t)$ of the basic waterway observed by the altimetry satellite and the section width $B_{basic}(t)$ observed by the orthophoto remote sensing image is established, or the process graphs of $H_{basic}(t)$~t and $B_{basic}(t)$~t are plotted.

S22. The section water surface width at the time points of the water level observed by the altimetry satellite, and the water level at the time points of the section width observed by the orthophoto remote sensing image are solved, or the section water surface width at the time points of the water level observed by the altimetry satellite is interpolated in the process graph of $B_{basic}(t)$~t, and the water level at the time points of the section width observed by the orthophoto remote sensing image is interpolated in the process graph of $H_{basic}(t)$~t.

S23. According to all values of the water level or water surface width solved or interpolated, the function $H_{basic}$~f($B_{basic}$) between the section water level and the section width of the basic waterway is established, or the correlation diagram of $H_{basic}$~$B_{basic}$ is plotted.

S24. The values of $H_{basic}$~f($B_{basic}$) are interpolated, or the correlation diagram of $H_{basic}$~$B_{basic}$ is discretized to form the set ($H_{basic\ i}$, $B_{basic\ i}$) of the section water level and the section width of the basic waterway.

S25. At least one time point when a recently water level is slightly lower than $H_{basic\ i}$ and at least one time point when a recently water level is slightly higher than $H_{basic\ i}$ are selected to closely observe orthophoto remote sensing images, the water-bank intersection point coordinates corresponding to the left and right banks of the river are checked, and three-dimensional coordinate sets ($x_{basic\ left\ i}$, $y_{basic\ left\ i}$, $H_{basic\ i}$) and ($x_{basic\ right\ i}$, $y_{basic\ right\ i}$, $H_{basic\ i}$) are constructed.

Specifically, $H_{basic\ i}$ is the discretized section water level of the basic waterway.

($x_{basic\ left\ i}$, $y_{basic\ left\ i}$, $H_{basic\ i}$) and ($x_{basic\ right\ i}$, $y_{basic\ right\ i}$, $H_{basic\ i}$) are the coordinate sets constituted by the water-bank intersection point coordinates of the left and right banks, and the section water level of the basic waterway.

3. The Reconstruction Method for the Fixed Waterway Section Coupling

By using the historical information of the altimetry satellite for the basic waterway section, the cartographic satellite near the basic waterway section, and the orthophoto remote sensing image satellite near the basic waterway section, through a coupling of the revisit time and the hydraulic interaction between the altimetry satellite and the cartographic satellite, the set of the water level of the fixed waterway section corresponding to the basic waterway section is constructed. Through the joint coupling of the revisit time and observation elements between the altimetry satellite and the orthophoto remote sensing image satellite, the coordinate set of the water level, the water surface width and the water-bank intersection points of the fixed waterway section is constructed.

The implementation steps of the coupling of the revisit time and the hydraulic interaction between the altimetry satellite and the cartographic satellite for the fixed waterway section are as follows:

S301. The time-dependent joint distribution function between the section water level $H_{basic}(t)$ of the basic waterway observed by the altimetry satellite and the water level $H_{cartographic\ basic}(t)$ observed by the cartographic satellite is established, or the process graphs of $H_{basic}(t)$~t and $H_{cartographic\ basic}(t)$~t are plotted.

S302. The time point set $t_j$ and $H_{cartographic\ basic\ i}(t_j)$ of the joint distribution function corresponding to $H_{basic\ i}$ are solved, or all occurring time point sets $t_j$ corresponding to $H_{basic\ i}$ are solved or interpolated in $H_{basic}(t)$~t and $H_{cartographic\ basic\ i}(t_j)$ corresponding to all $t_j$ are solved or interpolated in $H_{cartographic\ basic}(t)$–t.

Specifically, $H_{basic\ i}$ is the discretized section water level of the basic waterway.

$H_{cartographic\ basic\ i}(t_j)$ is the water level observed by the cartographic satellite at the time point $t_j$.

$t_j$ is the time point.

S303 The mathematical expected values $H_{cartographic\ basic\ i}=E(H_{cartographic\ basic\ i}(t_j))$ of all $H_{cartographic\ basic\ i}(t_j)$ and $\Delta H_{basic\ i}=H_{basic\ i}-H_{cartographic\ basic\ i}$ are calculated, where $\Delta H_{basic\ i}$ is taken as a systematic error between the water level observed by the altimetry satellite and the water level observed by the cartographic satellite.

S304. The distribution function of the water level $H_{cartographic\ k}(t)$ of the k-th fixed waterway section observed by a digital surface model of the cartographic satellite is established, and the $H_{cartographic\ k\ i}(t_j)$ corresponding to the time point set $t_j$ is solved or interpolated, or the process graph of $H_{cartographic\ k}(t)$~t of the k-th fixed waterway section of the digital surface model of the cartographic satellite is plotted and the $H_{cartographic\ k\ i}(t_j)$ corresponding to the time point set $t_j$ is interpolated in the process graph.

Specifically, $H_{cartographic\ k\ i}(t_j)$ is the water level of the k-th fixed waterway section at the time point $t_j$.

S305. The mathematical expected values $H_{cartographic\ k\ i}=E(H_{cartographic\ k\ i}(t_j))$ of all $H_{cartographic\ k\ i}(t_j)$ are calculated, to add the systematic error $\Delta H_{basic\ i}$ between the water level observed by the altimetry satellite and the water level observed by the cartographic satellite, that is, $H_{k\ i}=H_{cartographic\ k\ i}+\Delta H_{basic\ i}$ is the water level of the k-th fixed waterway section corresponding to $H_{basic\ i}$.

The implementation steps of the joint coupling of the revisit time and the observation elements between the altimetry satellite and the orthophoto remote sensing image satellite for the fixed waterway section are as follows:

S311. The time-dependent joint distribution function between the section water level $H_{basic}(t)$ of the basic waterway observed by the altimetry satellite and the section width $B_k(t)$ of the k-th fixed waterway section observed by the orthophoto remote sensing image is established, or the process graphs of $H_{basic}(t)$~t and $B_k(t)$~t are plotted.

S312. The time point set $t_j$ and $B_{k\ i}(t_j)$ of the joint distribution function corresponding to $H_{basic\ i}$ are solved, or all the occurring time point sets $t_j$ corresponding to $H_{basic\ i}$ are solved or interpolated in $H_{basic}(t)$~t and $B_{k\ i}(t_j)$ corresponding to all $t_j$ are solved or interpolated in $B_k(t)$~t.

Specifically, $B_{k\ i}(t_j)$ is the water surface width of the k-th fixed waterway section at the time point $t_j$.

S313. The mathematical expected values $B_{k\ i}=E(B_{k\ i}(t_j))$ of all $B_{k\ i}(t_j)$ are calculated, and the set $(H_{k\ i}, B_{k\ i})$ of the water level and the section width of the k-th fixed waterway section corresponding to $H_{basic\ i}$ is established.

S314. At least one time point when a recently water level is slightly lower than $H_{basic\ i}$ and at least one time point when a recently water level is slightly higher than $H_{basic\ i}$ are selected to closely observe orthophoto remote sensing images, the water-bank intersection point coordinates corresponding to the left and right banks of the k-th fixed waterway section are checked, and three-dimensional coordinate sets $(x_{k\ left\ i}, y_{k\ left\ i}, H_{k\ i})$ and $(x_{k\ right\ i}, y_{k\ right\ i}, H_{k\ i})$ are constructed, where, $(x_{k\ left\ i}, y_{k\ left\ i}, H_{k\ i})$ and $(x_{k\ right\ i}, y_{k\ right\ i}, H_{k\ i})$ are the three-dimensional coordinate sets constituted by the water-bank intersection point coordinates corresponding to the left and right banks of the k-th fixed waterway section, and the corresponding fixed section.

4. The Reconstruction Method for the River Reach Waterway Terrain

According to the coordinate set of the water level and water-bank intersection points of the basic waterway section and the fixed waterway section, the waterway terrain survey scatter points are reconstructed, and the waterway terrain map of the river reach is drawn according to the relevant mapping requirements of Code for waterway survey.

The implementation steps of reconstructing the waterway terrain survey scatter points are as follows:

S41. The three-dimensional coordinates $(x_{basic\ left\ i}, y_{basic\ left\ i}, H_{basic\ i})$ and $(x_{basic\ right\ i}, y_{basic\ right\ i}, H_{basic\ i})$ of the water-bank intersection points of the left and right banks of the basic waterway section corresponding to all $H_{basic\ i}$, (i=1, 2, . . . n) are obtained.

S42. The three-dimensional coordinates $(x_{k\ left\ i}, y_{k\ left\ i}, H_{k\ i})$ and $(x_{k\ right\ i}, y_{k\ right\ i}, H_{k\ i})$ of the water-bank intersection points of the left and right banks of all fixed waterway sections (k=1, 2, . . . m) corresponding to all $H_{basic\ i}$, (i=1, 2, . . . n) are obtained.

S43. All the three-dimensional coordinate points $(x_{basic\ left\ i}, y_{basic\ left\ i}, H_{basic\ i})$, $(x_{basic\ right\ i}, y_{basic\ right\ i}, H_{basic\ i})$, $(x_{k\ left\ i}, y_{k\ left\ i}, H_{k\ i})$, and $(x_{k\ right\ i}, y_{k\ right\ i}, H_{k\ i})$ are regarded as the actually measured points to form the waterway terrain survey scatter points.

The above embodiments only show the implement method of the present invention by a more specific and detailed description, and cannot be understood as a limitation on the scope of the patent for the present invention. It should be indicated that for the ordinary skilled in the art, a plurality of deformations and improvements may be made without departing from the conception of the present invention, which fall within the scope of protection of the present invention. Therefore, the scope of protection of the patent of the present invention shall be based on the appended claims.

What is claimed is:

1. A high-precision waterway reconstruction method based on a multi-satellite source information coupling, comprising the following steps:
   S1: determining a waterway section: according to characteristics of a river to be observed in a waterway, selecting various types of satellites to revisit rivers having a close position with each other, and determining a riverway cross section where a waterway echo point of a high-precision altimetry satellite is located as a basic waterway section; selecting a cross section as a fixed waterway section at a certain distance at an upstream and a downstream of the basic waterway section by using latest high-precision orthophoto remote sensing image information;

S2: reconstructing a basic waterway section high-precision coupling: by using historical information of the high-precision altimetry satellite for the basic waterway section and an orthophoto remote sensing image satellite near the basic waterway section, and through a joint coupling between satellite source revisit time and observation elements, constructing a high-precision coordinate set of a water level, a water surface width and water-bank intersection points of the basic waterway section;

wherein in S2, implementation steps of the joint coupling between the satellite source revisit time and the observation elements comprise:

S21: establishing a first time-dependent joint distribution function between a section water level $H_{basic}(t)$ of a basic waterway observed by the high-precision altimetry satellite and a section width $B_{basic}(t)$ observed by the orthophoto remote sensing image satellite, or plotting process graphs of $H_{basic}(t) \sim t$ and $B_{basic}(t) \sim t$;

S22: solving a section water surface width at time points of a water level observed by the high-precision altimetry satellite, and a water level at time points of a section width observed by the orthophoto remote sensing image satellite, or interpolating the section water surface width at the time points of the water level observed by the high-precision altimetry satellite in a process graph of $B_{basic}(t) \sim t$, and interpolating the water level at the time points of the section width observed by the orthophoto remote sensing image satellite in a process graph of $H_{basic}(t) \sim t$;

S23: according to all values of the water level at the time points of the section width observed by the orthophoto remote sensing image satellite or the section water surface width at the time points of the water level observed by the high-precision altimetry satellite solved or interpolated, establishing a function $H_{basic} \sim f(B_{basic})$ between the section water level and the section width of the basic waterway, or plotting a correlation diagram of $H_{basic} \sim B_{basic}$;

S24: interpolating values of the function $H_{basic} \sim f(B_{basic})$, or discretizing the correlation diagram of $H_{basic} \sim B_{basic}$ to form $(H_{basic\ i}, B_{basic\ i})$;

wherein $(H_{basic\ i}, B_{basic\ i})$ is a set of the section water level and the section width of the basic waterway; and S25: selecting at least one time point when a recently water level is slightly lower than $H_{basic\ i}$ and at least one time point when a recently water level is slightly higher than $H_{basic\ i}$ to closely observe orthophoto remote sensing images, checking water-bank intersection point coordinates corresponding to left banks and right banks of the river, and constructing three-dimensional coordinate sets $(x_{basic\ left\ i}, y_{basic\ left\ i}, H_{basic\ i})$ and $(x_{basic\ right\ i}, y_{basic\ right\ i}, H_{basic\ i})$;

wherein $H_{basic\ i}$ is a discretized section water level of the basic waterway;

the three-dimensional coordinate sets $(x_{basic\ left\ i}, y_{basic\ left\ i}, H_{basic\ i})$ and $(x_{basic\ right\ i}, y_{basic\ right\ i}, H_{basic\ i})$ are coordinate sets comprising the water-bank intersection point coordinates of the left banks and the right banks, and the discretized section water level of the basic waterway;

S3: reconstructing a fixed waterway section coupling: by using historical information of the high-precision altimetry satellite for the basic waterway section, a cartographic satellite near the basic waterway section, and the orthophoto remote sensing image satellite near the basic waterway section, through a coupling of revisit time and hydraulic interaction between the high-precision altimetry satellite and the cartographic satellite, constructing a set of water levels of the fixed waterway section corresponding to the basic waterway section;

through a joint coupling of revisit time and observation elements between the high-precision altimetry satellite and the orthophoto remote sensing image satellite, constructing a coordinate set of the water levels, a water surface width and water-bank intersection points of the fixed waterway section;

wherein in S3, implementation steps of the coupling of the revisit time and the hydraulic interaction between the high-precision altimetry satellite and the cartographic satellite, comprise:

S301: establishing a second time-dependent joint distribution function between the section water level $H_{basic}(t)$ of the basic waterway observed by the high-precision altimetry satellite and a water level $H_{cartographic\ basic}(t)$ observed by the cartographic satellite, or plotting process graphs of $H_{basic}(t) \sim t$ and $H_{cartographic\ basic}(t) \sim t$;

S302: solving a time point set $t_j$ and $H_{cartographic\ basic\ i}(t_j)$ of the second time-dependent joint distribution function corresponding to $H_{basic\ i}$, or solving or interpolating all time point sets $t_j$ corresponding to $H_{basic\ i}$ in $H_{basic}(t) \sim t$ and solving or interpolating $H_{cartographic\ basic\ i}(t_j)$ corresponding to the all time point sets $t_j$ in $H_{cartographic\ basic}(t) \sim t$;

wherein $H_{basic\ i}$ is the discretized section water level of the basic waterway;

$H_{cartographic\ basic\ i}(t_j)$ is the water level observed by the cartographic satellite at a time point $(t_j)$;

wherein $(t_j)$ is the time point;

S303: calculating mathematical expected values $H_{cartographic\ basic\ i} = E(H_{cartographic\ basic\ i}(t_j))$ of all $H_{cartographic\ basic\ i}(t_j)$, and $\Delta H_{basic\ i} = H_{basic\ i} - H_{cartographic\ basic\ i}$, wherein $\Delta H_{basic\ i}$ is taken as a systematic error between the water level observed by the high-precision altimetry satellite and the water level observed by the cartographic satellite;

S304: establishing a distribution function of a water level $H_{cartographic\ k}(t)$ of a k-th fixed waterway section observed by a digital surface model of the cartographic satellite, and solving or interpolating $H_{cartographic\ k\ i}(t_j)$ corresponding to the time point set $t_j$, or plotting a process graph of $H_{cartographic\ k}(t) \sim t$ of the k-th fixed waterway section observed by the digital surface model of the cartographic satellite and interpolating $H_{cartographic\ k\ i}(t_j)$ corresponding to the time point set $t_j$ in the process graph of $H_{cartographic\ k}(t) \sim t$;

wherein $H_{cartographic\ k\ i}(t_j)$ is a water level of the k-th fixed waterway section at the time point $(t_j)$; and S305: calculating mathematical expected values $H_{cartographic\ k\ i} = E(H_{cartographic\ k\ i}(t_j))$ of all $H_{cartographic\ k\ i}(t_j)$, to add the systematic error $\Delta H_{basic\ i}$ between the water level observed by the high-precision altimetry satellite and the water level observed by the cartographic satellite, wherein $H_{k\,i}=H_{cartographic\,k\,i}(t)+\Delta H_{basic\,i}$ is a water level of the k-th fixed waterway section corresponding to $H_{basic\,i}$; and S4: reconstructing a river reach waterway terrain: according to the coordinate set of the water levels and the water-bank intersection points of the basic waterway section, and the coordinate set of the water levels and the water-bank intersection points of the fixed waterway section, reconstructing waterway terrain survey scatter points, and drawing contours for mapping according to a mapping scale and a scatter point set.

2. The high-precision waterway reconstruction method based on the multi-satellite source information coupling according to claim 1, wherein the waterway comprises various types of water bodies of a natural river, a large canal, a lake, and a reservoir.

3. The high-precision waterway reconstruction method based on the multi-satellite source information coupling according to claim 1, wherein multi-satellite sources comprise an altimetry satellite equipped with laser or radar altimeters, the orthophoto remote sensing image satellite, a resource with an integrated three-dimensional imaging, or the cartographic satellite.

4. The high-precision waterway reconstruction method based on the multi-satellite source information coupling according to claim 1, wherein the waterway section is a section arranged on the river and perpendicular to a flow direction of the river.

5. The high-precision waterway reconstruction method based on the multi-satellite source information coupling according to claim 1, wherein in S1, revisit positions of the various types of satellites refer to positions, wherein the various types of satellites pass the positions repeatedly during an orbital operation.

6. The high-precision waterway reconstruction method based on the multi-satellite source information coupling according to claim 1, wherein in S1, the waterway echo point of the high-precision altimetry satellite refers to a position where a radar or a laser emitted by the high-precision altimetry satellite and perpendicular to the earth is reflected by a water surface of the river.

7. The high-precision waterway reconstruction method based on the multi-satellite source information coupling according to claim 1, wherein in S3, implementation steps of the joint coupling of the revisit time and the observation elements between the high-precision altimetry satellite and the orthophoto remote sensing image satellite comprise:

S311: establishing a third time-dependent joint distribution function between the section water level $H_{basic}(t)$ of the basic waterway observed by the high-precision altimetry satellite and a section width $B_k(t)$ of the k-th fixed waterway section observed by the orthophoto remote sensing image satellite, or plotting process graphs of $H_{basic}(t)\sim t$ and $B_k(t)\sim t$;

S312: solving the time point set $t_j$ and $B_{k\,i}(t_j)$ of the third time-dependent joint distribution function corresponding to $H_{basic\,i}$, or solving or interpolating the all time point sets $t_j$ corresponding to $H_{basic\,i}$ in $H_{basic}(t)\sim t$ and solving or interpolating $B_{k\,i}(t_j)$ corresponding to the all time point sets $t_j$ in $B_k(t)\sim t$;

wherein $B_{k\,i}(t_j)$ is a water surface width of the k-th fixed waterway section at the time point $(t_j)$;

S313: calculating mathematical expected values $B_{k\,i}=E(B_{k\,i}(t_j))$ of all $B_{k\,i}(t_j)$, and establishing a set $(H_{k\,i}, B_{k\,i})$ of the water level and the section width of the k-th fixed waterway section corresponding to $H_{basic\,i}$; and S314: selecting the at least one time point when the recently water level is slightly lower than $H_{basic\,i}$ and the at least one time point when the recently water level is slightly higher than $H_{basic\,i}$ to closely observe the orthophoto remote sensing images, checking water-bank intersection point coordinates corresponding to left banks and right banks of the k-th fixed waterway section, and constructing three-dimensional coordinate sets $(x_{k\,left\,i}, y_{k\,left\,i}, H_{k\,i})$ and $(x_{k\,right\,i}, y_{k\,right\,i}, H_{k\,i})$;

wherein the three-dimensional coordinate sets $(x_{k\,left\,i}, y_{k\,left\,i}, H_{k\,i})$ and $(x_{k\,right\,i}, y_{k\,right\,i}, H_{k\,i})$ are three-dimensional coordinate sets comprising the water-bank intersection point coordinates corresponding to the left banks and right banks of the k-th fixed waterway section, and a corresponding fixed section.

8. The high-precision waterway reconstruction method based on the multi-satellite source information coupling according to claim 7, wherein in S4, implementation steps of reconstructing the waterway terrain survey scatter points are as follows:

S41: obtaining the three-dimensional coordinates $(x_{basic\,left\,i}, y_{basic\,left\,i}, H_{basic\,i})$ and $(x_{basic\,right\,i}, y_{basic\,right\,i}, H_{basic\,i})$ of the water-bank intersection points of the left banks and right banks of the basic waterway section corresponding to all $H_{basic\,i}$, (i=1, 2, . . . n);

S42: obtaining the three-dimensional coordinates $(x_{k\,left\,i}, y_{k\,left\,i}, H_{k\,i})$ and $(x_{k\,right\,i}, y_{k\,right\,i}, H_{k\,i})$ of the water-bank intersection points of the left banks and right banks of all fixed waterway sections (k=1, 2, . . . m) corresponding to all $H_{basic\,i}$, (i=1, 2, . . . n); and S43: regarding all the three-dimensional coordinates $(x_{basic\,left\,i}, y_{basic\,left\,i}, H_{basic\,i})$, $(x_{basic\,right\,i}, y_{basic\,right\,i}, H_{basic\,i})$, $(x_{k\,left\,i}, y_{k\,left\,i}, H_{k\,i})$ and $(x_{k\,right\,i}, y_{k\,right\,i}, H_{k\,i})$ as actually measured points to form the waterway terrain survey scatter points.

* * * * *